United States Patent
Cadigan et al.

(10) Patent No.: US 12,430,377 B2
(45) Date of Patent: Sep. 30, 2025

(54) RAPID ADAPTATION TO CONTEMPORARY TEXT DATASETS

(71) Applicant: SRI International, Menlo Park, CA (US)

(72) Inventors: John Cadigan, San Diego, CA (US); Martin Graciarena, Belmont, CA (US)

(73) Assignee: SRI International, Menlo Park, CA (US)

( * ) Notice: Subject to any disclaimer, the term of this patent is extended or adjusted under 35 U.S.C. 154(b) by 104 days.

(21) Appl. No.: 18/472,761

(22) Filed: Sep. 22, 2023

(65) Prior Publication Data

US 2024/0152540 A1 May 9, 2024

Related U.S. Application Data

(60) Provisional application No. 63/382,213, filed on Nov. 3, 2022.

(51) Int. Cl.
*G06F 16/35* (2025.01)
*G06F 16/353* (2025.01)

(52) U.S. Cl.
CPC ................ *G06F 16/353* (2019.01)

(58) Field of Classification Search
None
See application file for complete search history.

(56) References Cited

U.S. PATENT DOCUMENTS

| | | | |
|---|---|---|---|
| 6,697,998 B1 * | 2/2004 | Damerau | G06F 16/355 |
| 10,867,246 B1 * | 12/2020 | Nguyen | G06F 16/35 |
| 2016/0092791 A1 * | 3/2016 | Moghaddam | G06F 16/355 |
| 2021/0334468 A1 * | 10/2021 | Yu | G06F 16/35 |
| 2022/0114490 A1 * | 4/2022 | Das | G06F 16/35 |
| 2023/0049418 A1 * | 2/2023 | Saha | G06F 16/285 |
| 2023/0076893 A1 * | 3/2023 | Arani | G06F 16/35 |
| 2024/0004913 A1 * | 1/2024 | Yuan | G06F 18/22 |

OTHER PUBLICATIONS

"Prodigy: Radically efficient machine teaching. An annotation tool powered by active learning.", Retrieved from: https://prodi.gy/, Accessed on: Oct. 5, 2022, 5 pp.

Cao et al., "Deep transfer learning mechanism for fine-grained cross-domain sentiment classification", Connection Science, vol. 33, No. 4, May 17, 2021, p. 911-928.

(Continued)

*Primary Examiner* — Son T Hoang
(74) *Attorney, Agent, or Firm* — Shumaker & Sieffert, P.A.

(57) ABSTRACT

In an example, a method for adapting a machine learning model includes receiving first input data; choosing a first set of unlabeled textual spans in the first input data, wherein the chosen first set of unlabeled textual spans is associated with a first domain; labeling the chosen first set of unlabeled textual spans to generate a labeled first set of textual spans; categorizing the labeled first set of textual spans to generate a categorized labeled first set of textual spans; receiving second input data; choosing a second set of unlabeled textual spans, wherein the second set of unlabeled textual spans is associated with a second domain; and adapting the machine learning model to the second domain based on the categorized second set of unlabeled textual spans that is generated based on the categorized labeled first set of textual spans.

17 Claims, 6 Drawing Sheets

(56) References Cited

OTHER PUBLICATIONS

Chalkidis et al., "MultiEURLEX—A multi-lingual and multi-label legal document classification dataset for zero-shot cross-lingual transfer", arXiv, Sep. 6, 2021, 23 pp.
Da San Martino et al., "SemEval—2020 Task 11: Detection of Propaganda Techniques in News Articles", arXiv, Sep. 6, 2020, 37 pp.
Dimitrov et al., "SemEval—2021 Task 6: Detection of Persuasion Techniques in Texts and Images", arXiv, Apr. 25, 2021, 29 pp.
Xie et al., "Unsupervised Data Augmentation for Consistency Training", arxiv, Nov. 5, 2020, 20 pp.
Zhang et al., "ALLSH: Active Learning Guided by Local Sensitivity and Hardness", arXiv, Sep. 23, 2022, 15 pp.

\* cited by examiner

RAPID ADAPTATION TO CONTEMPORARY TEXT DATASETS

This application claims the benefit of U.S. Patent Application No. 63/382,213, filed Nov. 3, 2022, which is incorporated by reference herein in its entirety.

GOVERNMENT RIGHTS

This invention was made with Government support under contract no. HR00112000124 awarded by the Defense Advanced Research Projects Agency. The Government has certain rights in this invention.

TECHNICAL FIELD

This disclosure is related to machine learning systems, and more specifically to rapid adaptation to contemporary text datasets.

BACKGROUND

A machine learning model's performance in processing data according to how it is trained may degrade for various reasons. In general, degradation happens when a model processes data that is different from the training dataset. When a model is being trained, it learns the features that are most pertinent to the training dataset. However, learned features are unique to a specified training dataset, such that small differences between the training dataset and a test dataset could cause the model to perform poorly.

Dataset drift is a change in the distribution of data over time. Dataset drifts may happen for a variety of reasons, such as changes in the way people use language or the emergence of new topics. Machine learning models are trained on data to learn how to make predictions. If the data that a machine learning model is trained on changes over time or if the new data is from a different domain, the model's performance may degrade because the trained machine learning model may no longer be able to recognize the patterns of language that are common in the new data. For example, a model trained to detect news topics decades ago will be unsuitable for contemporary news with changes in topics.

SUMMARY

Over time, the data that models are trained on may change. Data changes may lead to a degradation in the performance of the model, as it may not be able to accurately predict new data that is different from the data it was trained on. In general, the disclosure describes techniques for adapting older models to handle contemporary data and adapting models to handle data from a different domain, thereby mitigating the degradation of models through time. There are a number of ways to adapt older models to handle contemporary data. One way is to retrain the model on a new dataset that includes both the old and new data.

More specifically, the disclosure describes techniques to adapt a machine learning model and dataset based on older news to contemporary topics. The model may be retrained on a new dataset that includes both old and new articles. Such retraining may help the model to learn the new patterns in the data and improve its performance. Domain adaptation involves adapting a model that has been trained on one domain, such as older news articles, to a new domain, such as contemporary news articles. Domain adaptation may be done using a technique called data augmentation, which involves artificially increasing the size of the dataset by creating new labeled data that is similar to the existing labeled data.

The disclosed techniques may include adapting an old model to handle contemporary data with three components: active learning, model adaptation, and consistency loss. Active learning is a technique for selecting the most informative data points to label. Active learning may be done by using a variety of techniques, such as, but not limited to, uncertainty sampling, query by committee, and expected model change. Model adaptation is the process of updating the parameters of a model to improve its performance on new data. Model adaptation may be done by using a variety of techniques, such as, but not limited to, gradient descent, Bayesian methods, and ensemble methods. Consistency loss is a measure of how much the model's predictions change when new data is added. A high consistency loss indicates that the model is not well-adapted to the new data. In other words, the aforementioned three components may be used together to adapt an old model to handle contemporary data. The active learning component may be used to select the most informative data points to label, which may help the model to learn the new patterns in the new data. The model adaptation component may then be used to update the parameters of the model to improve its performance on the new data. The consistency loss component may be used to monitor the performance of the model and to identify any problems that may need to be addressed.

The techniques may provide one or more technical advantages that realize at least one practical application. For example, active learning may reduce the amount of annotation required for new data because active learning allows the model to learn from the most informative examples, which may help the model to generalize better to new data. Additionally, if domains comprise temporal domains, in which dominant distinctions between the domains is a result of a passage of time, adapting a model trained on old data (first domain) with a small set of contemporary data (second domain) may also reduce the amount of annotation required for new data because the model may be updated to reflect the new patterns in the data, which may help the model to generalize better to new data (second domain). Some of the benefits of using active learning and model adaption to reduce the amount of annotation required for new data may include but are not limited to: saving time and money, improving the quality of the annotations, helping the model to generalize better to new data.

In an aspect, two domains may be different in terms of the time period that they cover. The first domain may include old data, which is data that was collected in the past. The second domain may include contemporary data, which is data that was collected in the present. For example, the first domain could be a dataset of historical weather data, while the second domain could be a dataset of current weather data. The first domain would include data from the past, such as the weather conditions in a particular city on a particular day in 1910. The second domain would include data from the present, such as the weather conditions in a particular city on a particular day in 2023.

In an example, a method for adapting a machine learning model includes: receiving first input data; choosing a first set of unlabeled textual spans in the first input data, wherein the chosen first set of unlabeled textual spans is associated with a first domain; labeling the chosen first set of unlabeled textual spans to generate a labeled first set of textual spans; categorizing the labeled first set of textual spans to generate a categorized labeled first set of textual spans; receiving second input data; choosing a second set of unlabeled textual spans, wherein the second set of unlabeled textual spans is associated with a second domain; and adapting the machine learning model to the second domain based on a categorized second set of unlabeled textual spans that is generated based on the categorized labeled first set of textual spans.

In an example, a computing system comprises: an input device configured to receive first input data and second input data; processing circuitry and memory for executing a machine learning system, wherein the machine learning system is configured to: choose a first set of unlabeled textual spans in the first input data, wherein the chosen first set of unlabeled textual spans is associated with a first domain; label the chosen first set of unlabeled textual spans to generate a labeled first set of textual spans; categorize the labeled first set of textual spans to generate a categorized labeled first set of textual spans for the machine learning model; choose a second set of unlabeled textual spans in the second input data, wherein the second set of unlabeled textual spans is associated with a second domain; and adapt the machine learning model to the second domain based on a categorized second set of unlabeled textual spans that is generated based on the categorized labeled first set of textual span.

In an example, non-transitory computer-readable media comprises machine readable instructions for configuring processing circuitry to: receive first input data; choose a first set of unlabeled textual spans in the first input data, wherein the chosen first set of unlabeled textual spans is associated with a first domain; label the chosen first set of unlabeled textual spans to generate a labeled first set of textual spans; categorize the labeled first set of textual spans to generate a categorized labeled first set of textual spans for the machine learning model; receive second input data; choose a second set of unlabeled textual spans in the second input data, wherein the second set of unlabeled textual spans is associated with a second domain; and adapt the machine learning model to the second domain based on a categorized second set of unlabeled textual spans that is generated based on the categorized labeled first set of textual spans.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Domain adaptation to contemporary data and/or to data from a different domain is a technique that can be used to improve the performance of a machine learning model on data that has been collected recently or data that has been collected in a different domain. Domain adaptation is useful in cases where the data distribution has changed significantly over time, or where there is a limited amount of labeled data available for the contemporary data. Whether data is considered "contemporary" or "old" can depend on the context, the domain, or user preference for instance. For example, any data less than 10 years old may be considered contemporary for certain subject matter domains, while any data more than a year old may be considered out of date for certain subject matter domains. Thus, contemporary data with which to train a machine learning model may be defined, in some cases, as data that has been generated after the most recent of the old was used for training the machine learning model.

Consistency loss is a measure of how much a model's predictions change when new data is added. A high consistency loss indicates that the model is not well-adapted to the new data. Consistency loss may be caused by concept drift, which is a change in the underlying distribution of the data over time.

Consistency loss may be used in active learning to select examples that are likely to be informative about concept drift. Examples that cause the model's predictions to change the most are likely to be the ones that are most different from the data that the model was trained on. For example, if a model was trained to classify images of cats and dogs once a new image of a cat with a different color fur is added, the model's predictions may change because the new image is different from the data that the model was trained on. The consistency loss for this example may be high, which may indicate that the new image a good example to label.

Consistency loss may be a particularly effective way to address concept drift in active learning. Consistency loss may help to ensure that the model is constantly learning and adapting to the changing data distribution. In addition, consistency loss may help to avoid overfitting to the old data and may help to improve the overall performance of the model. However, it may be difficult to select the most informative examples based on the consistency loss alone.

Organizations are likely to have much larger quantities of relevant, unlabeled text data than labeled data because unlabeled data is much easier to collect. There are a number of reasons why it is difficult to collect labeled data. First, hiring human annotators to label data may be an expansive process. Second, labeling data may be time-consuming, especially if the data is complex or noisy. Third, it may be difficult to get human annotators to agree on the labels for the data.

As a result of these challenges, many organizations may have large quantities of unlabeled text data that is unused. Unlabeled text data is a missed opportunity, as unlabeled text data may be used to train machine learning models that may be used for a variety of tasks, such as text classification, sentiment analysis, and topic modeling.

One technique that may be used to make use of unlabeled text data is called semi-supervised learning. Semi-supervised learning is a type of machine learning that uses a combination of labeled data and unlabeled data. Semi-supervised learning algorithms may learn from the labeled data and the unlabeled data to improve their performance.

The techniques described in this disclosure may provide an effective way to use unlabeled data to adapt older models to handle contemporary data. The disclosed techniques may be used to learn from the patterns in the unlabeled data, which may help the model to improve its performance on new data. By using the disclosed techniques, organizations may adapt older models to handle contemporary data without having to collect a large amount of labeled data. Adapting older models may save organizations time and money, and it may help them to improve the performance of their machine learning models.

The techniques described in this disclosure may enable avoiding certain risks associated with the domain that are due to consistency loss, which may hinge on being able to accurately paraphrase examples that may degrade in niche, technical domain. Concept drift is the change in the underlying distribution of the data over time. Concept drift may cause the model to become less accurate over time. Label noise is the presence of incorrect labels in the data. Label noise may also cause the model to become less accurate. Data scarcity is the lack of available data. Data scarcity may make it difficult to train a model that is accurate on the niche, technical domain.

The present disclosure describes techniques that may help to mitigate the aforementioned risks by: 1) using unlabeled data; 2) using active learning; and 3) using domain adaptation techniques. Using unlabeled data to train the model may help the model to learn the patterns in the data, which may help it to be more robust to concept drift and label noise. Active learning may help to select the most informative examples to label. For example, active learning may help the model to learn the most important concepts in the data, which may help the model to be more accurate on the niche, technical domain. Domain adaptation techniques may help to adapt the model to the niche, technical domain. In other words, domain adaptation techniques may help the model to learn the specific terminology and concepts that are used in the domain, which may help it to be more accurate. By using these techniques, organizations may avoid the risks associated with the domain and ensure that their models are accurate on the niche, technical domain.

In summary, in addition to established approaches, organizations may also use consistency loss to learn from larger amounts of unlabeled data which may be, for example, contemporary data, by using a technique called self-paced learning. Self-paced learning involves gradually increasing the amount of unlabeled data that is used to train the model. The model's guesses may be used to select the most informative examples to label.

Figure 1:
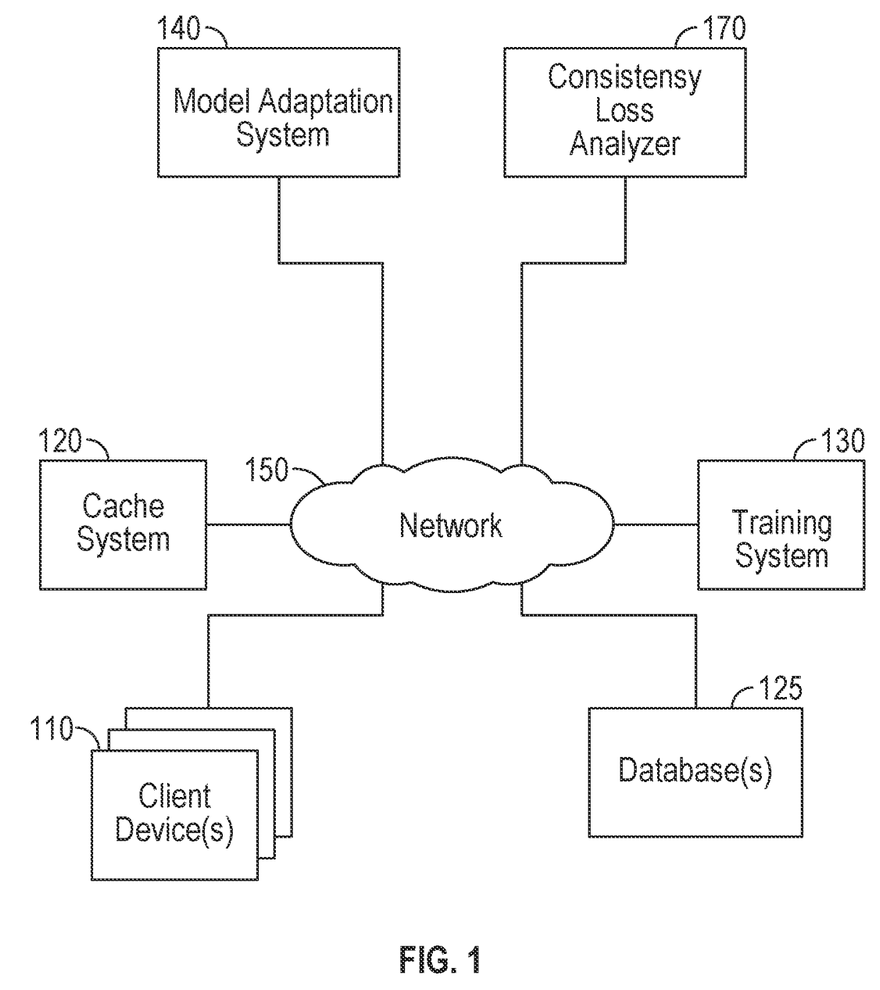
FIG. 1 illustrates conceptual architecture of an exemplary model adaptation system in accordance with the techniques of the disclosure.

FIG. 1 illustrates conceptual architecture of an exemplary model adaptation system in accordance with the techniques of the disclosure. The system may include a training system 130, model adaptation system 140, consistency loss analyzer 170, client device(s) 110, database(s) 125, a cache system 120, and a network 150 over which the various systems communicate and interact. The various computing devices described herein are exemplary and for illustration purposes only. The system may be reorganized or consolidated, as understood by a person of ordinary skill in the art, to perform the same tasks on one or more other servers or computing devices without departing from the scope of the disclosure.

The training system 130 may train a machine learning model Specifically, the training system 130 may train a model by batch processing the training data. The training system 130 may use any learning algorithm that may be known to a person of ordinary skill in the art without departing from the scope of the disclosure, including, large-scale distributed training of decision trees, linear and logistic models, unsupervised models (k-means), time series models, deep neural networks, and the like. The training system 130 may include a model configurator for configuring the training job. The training system 130 may specify model type, hyper-parameters, data source reference, and feature Domain Specific Language (DSL) expressions, as well as compute resource requirements (the number of machines, how much memory, whether or not to use GPUs, and the like). The training system 130 may also include a performance evaluator, which may evaluate the model based on any number of evaluation methodologies that are known to a person of ordinary skill in the art, including, but not limited to Receiver Operating Characteristic (ROC) curve and Precision-Recall (PR) curve, and the like.

The database(s) 125 may include databases for storing data, storing features, storing outcomes (training sets), and storing models. Other databases may be added or subtracted, as would be readily understood by a person of ordinary skill in the art, without departing from the scope of the disclosure.

Cache system 120 may store predictions made by the training system 130, the real-time predictions made by the model adaptation system 140 and analytical data provided by the consistency loss analyzer 170. Model adaptation system 140 may be a software system that helps to improve the performance of machine learning models by adapting them to new data or changing conditions. Model adaptation system 140 may be used to improve the accuracy, robustness, and efficiency of one or more machine learning models. Moreover, the cache 120 may store categories and category values associated with each prediction, such that, if a new request is made with the same categories and/or category values the predictions that are already stored in the cache system 120 may be used without having to make new prediction requests. Consistency loss analyzer 170 may be a system component configured to improve the performance of the machine learning models on the target domain even when there is limited labeled data, as described below in conjunction with FIG. 4.

Client device(s) 110 may include, generally, a computer or computing device including functionality for communicating (e.g., remotely) over a network 150. Data may be collected from client devices 110, and data requests may be initiated from each client device 110. Client device(s) 110 may be a server, a desktop computer, a laptop computer, personal digital assistant (PDA), an in- or out-of-car navigation system, a smart phone or other cellular or mobile phone, or mobile gaming device, among other suitable computing devices. Client devices 110 may execute one or more client applications, such as a web browser (e.g., Microsoft Explorer or Edge, Mozilla Firefox, Apple Safari, Google Chrome, Opera, etc.), or a dedicated application to submit user data, or to make prediction queries over a network 150.

A client device 110 may have a web browser and may have one or more add-ons, plug-ins, or other extensions. A client device 110 may enable a user to enter a Uniform Resource Locator (URL) or other address directing the web browser to a server, and the web browser may generate a Hyper Text Transfer Protocol (HTTP) request and communicate the HTTP request to server. The server may accept the HTTP request and communicate to the client device 110 one or more Hyper Text Markup Language (HTML) files responsive to the HTTP request. The client device 110 may render a web page based on the HTML files from server for presentation to the user. The present disclosure contemplates any suitable web page files. As an example, and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

This disclosure contemplates any suitable number of client devices, including computing systems taking any suitable physical form. As example and not by way of limitation, computing systems may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computing system may include one or more computer systems; be unitary or distributed; span multiple locations; span multiple machines; or reside in a cloud, which may include one or more cloud components in one or more networks. Where appropriate, one or more computing systems may perform without substantial spatial or temporal limitation one or more steps of one or more methods described or illustrated herein. As an example, and not by way of limitation, one or more computing systems may perform in real time or in batch mode one or more steps of one or more methods described or illustrated herein. One or more computing system may perform at different times or at different locations one or more steps of one or more methods described or illustrated herein, where appropriate.

Network 150 generally represents a network or collection of networks (such as the Internet or a corporate intranet, or a combination of both) over which the various components illustrated in FIG. 1 (including other components that may be necessary to execute the system described herein, as would be readily understood to a person of ordinary skill in the art). In particular aspects, network 150 is an intranet, an extranet, a virtual private network (VPN), a local area network (LAN), a wireless LAN (WLAN), a wide area network (WAN), a metropolitan area network (MAN), a portion of the Internet, or another network 150 or a combination of two or more such networks 150. One or more links may connect the systems and databases described herein to the network 150. In particular aspects, one or more links each includes one or more wired, wireless, or optical links. In particular aspects, one or more links may include an intranet, an extranet, a VPN, a LAN, a WLAN, a WAN, a MAN, a portion of the Internet, or another link or a combination of two or more such links. The present disclosure contemplates any suitable network 150, and any suitable link for connecting the various systems and databases described herein.

One or more links couple one or more systems, engines or devices to the network 150. In particular aspects, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable links coupling one or more systems, engines or devices to the network 150.

In particular aspects, each system or engine may be a unitary server or may be a distributed server spanning multiple computers or multiple datacenters. Systems, engines, or modules may be of various types, such as, for example and without limitation, web server, news server, mail server, message server, advertising server, file server, application server, exchange server, database server, or proxy server. In particular aspects, each system, engine or module may include hardware, software, or embedded logic components or a combination of two or more such components for carrying out the appropriate functionalities implemented or supported by their respective servers. For example, a web server is generally capable of hosting websites containing web pages or particular elements of web pages. More specifically, a web server may host HTML files or other file types or may dynamically create or constitute files upon a request and communicate them to clients' devices or other devices in response to HTTP or other requests from clients' devices or other devices. A mail server is generally capable of providing electronic mail services to various client's devices or other devices. A database server is generally capable of providing an interface for managing data stored in one or more data stores.

The system may also contain other subsystems and databases, which are not illustrated in FIG. 1, but would be readily apparent to a person of ordinary skill in the art. For example, the system may include databases for storing data, storing features, storing outcomes (training sets), and storing models. Other databases and systems may be added or subtracted, as would be readily understood by a person of ordinary skill in the art, without departing from the scope of the disclosure.

Figure 2:
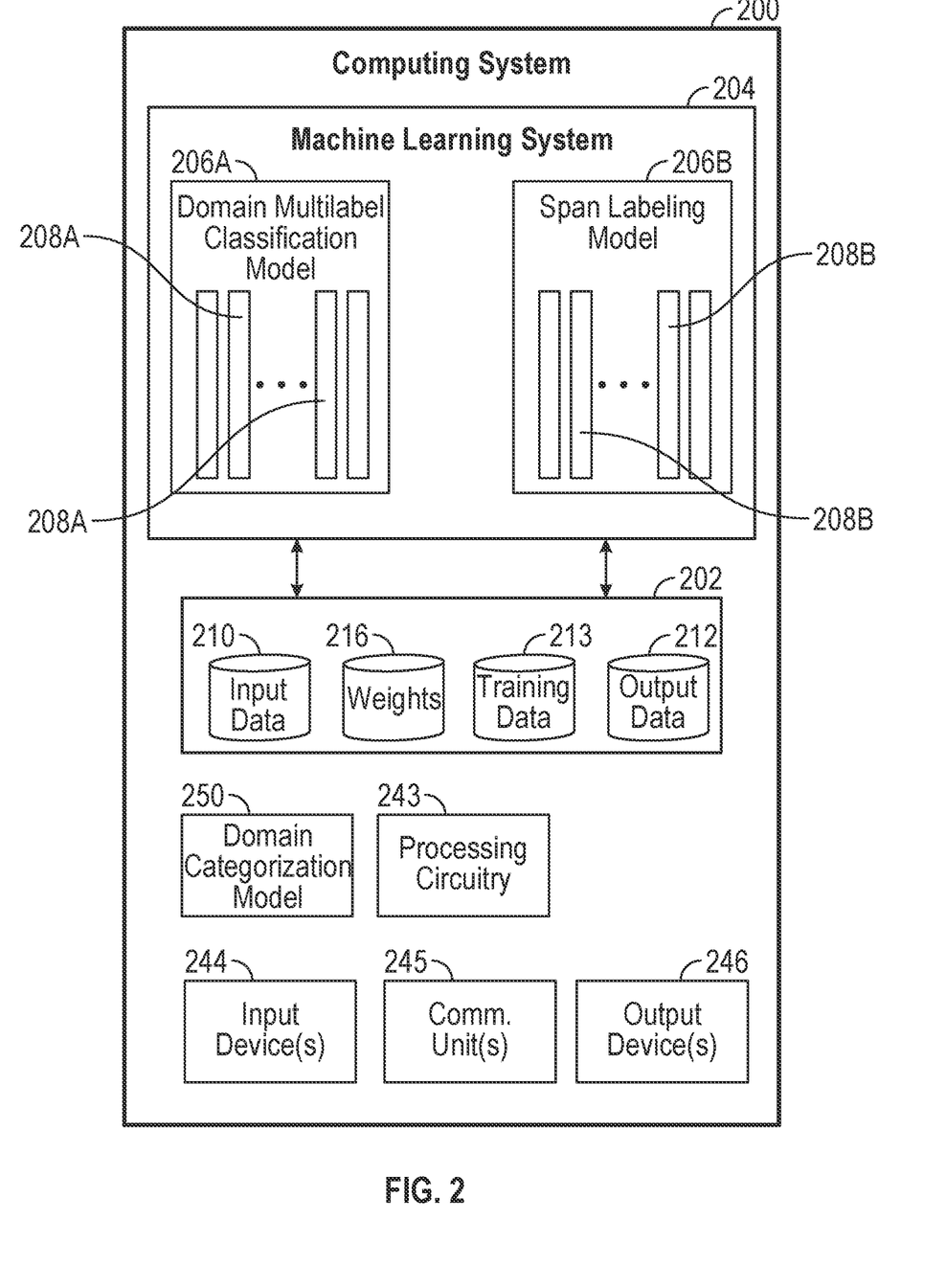
FIG. 2 is a block diagram illustrating an example system in accordance with the techniques of the disclosure.

FIG. 2 is a block diagram illustrating an example computing system 200. In an aspect, computing system 200 may comprise an instance of the model adaptation system 140. As shown, computing system 200 comprises processing circuitry 243 and memory 202 for executing a machine learning system 204 having one or more neural networks 206A-206B (collectively, "neural networks 206") comprising respective sets of layers 208A-208B (collectively, "layers 208"). In an aspect, neural networks 206 may include a domain multilabel classification model 206A and span labeling model 206B. Each of neural networks 206 may comprise various types of neural networks, such as, but not limited to, recursive neural networks (RNNs), convolutional neural networks (CNNs) and deep neural networks (DNNs).

Computing system 200 may be implemented as any suitable computing system, such as one or more server computers, workstations, laptops, mainframes, appliances, cloud computing systems, High-Performance Computing (HPC) systems (i.e., supercomputing) and/or other computing systems that may be capable of performing operations and/or functions described in accordance with one or more aspects of the present disclosure. In some examples, computing system 200 may represent a cloud computing system, server farm, and/or server cluster (or portion thereof) that provides services to client devices and other devices or systems. In other examples, computing system 200 may represent or be implemented through one or more virtualized compute instances (e.g., virtual machines, containers, etc.) of a data center, cloud computing system, server farm, and/or server cluster.

The techniques described in this disclosure may be implemented, at least in part, in hardware, software, firmware or any combination thereof. For example, various aspects of the described techniques may be implemented within processing circuitry 243 of computing system 200, which may include one or more of a microprocessor, a controller, a digital signal processor (DSP), an application specific integrated circuit (ASIC), a field-programmable gate array (FPGA), or equivalent discrete or integrated logic circuitry, or other types of processing circuitry. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

In another example, computing system 200 comprises any suitable computing system having one or more computing devices, such as desktop computers, laptop computers, gaming consoles, smart televisions, handheld devices, tablets, mobile telephones, smartphones, etc. In some examples, at least a portion of system 200 is distributed across a cloud computing system, a data center, or across a network, such as the Internet, another public or private communications network, for instance, broadband, cellular, Wi-Fi, ZigBee, Bluetooth® (or other personal area network—PAN), Near-Field Communication (NFC), ultrawideband, satellite, enterprise, service provider and/or other types of communication networks, for transmitting data between computing systems, servers, and computing devices.

Memory 202 may comprise one or more storage devices. One or more components of computing system 200 (e.g., processing circuitry 243, memory 202, domain categorization model 250) may be interconnected to enable inter-component communications (physically, communicatively, and/or operatively). In some examples, such connectivity may be provided by a system bus, a network connection, an inter-process communication data structure, local area network, wide area network, or any other method for communicating data. Processing circuitry 243 of computing system 200 may implement functionality and/or execute instructions associated with computing system 200. Examples of processing circuitry 243 may include microprocessors, application processors, display controllers, auxiliary processors, one or more sensor hubs, and any other hardware configured to function as a processor, a processing unit, or a processing device. Computing system 200 may use processing circuitry 243 to perform operations in accordance with one or more aspects of the present disclosure using software, hardware, firmware, or a mixture of hardware, software, and firmware residing in and/or executing at computing system 200. The one or more storage devices of memory 202 may be distributed among multiple devices.

Memory 202 may store information for processing during operation of computing system 200. In some examples, memory 202 comprises temporary memories, meaning that a primary purpose of the one or more storage devices of memory 202 is not long-term storage. Memory 202 may be configured for short-term storage of information as volatile memory and therefore not retain stored contents if deactivated. Examples of volatile memories include random access memories (RAM), dynamic random-access memories (DRAM), static random access memories (SRAM), and other forms of volatile memories known in the art. Memory 202, in some examples, may also include one or more computer-readable storage media. Memory 202 may be configured to store larger amounts of information than volatile memory. Memory 202 may further be configured for long-term storage of information as non-volatile memory space and retain information after activate/off cycles. Examples of non-volatile memories include magnetic hard disks, optical discs, Flash memories, or forms of electrically programmable memories (EPROM) or electrically erasable and programmable (EEPROM) memories. Memory 202 may store program instructions and/or data associated with one or more of the modules described in accordance with one or more aspects of this disclosure.

Processing circuitry 243 and memory 202 may provide an operating environment or platform for one or more modules or units (e.g., domain categorization model 250), which may be implemented as software, but may in some examples include any combination of hardware, firmware, and software. Processing circuitry 243 may execute instructions and the one or more storage devices, e.g., memory 202, may store instructions and/or data of one or more modules. The combination of processing circuitry 243 and memory 202 may retrieve, store, and/or execute the instructions and/or data of one or more applications, modules, or software. The processing circuitry 243 and/or memory 202 may also be operably coupled to one or more other software and/or hardware components, including, but not limited to, one or more of the components illustrated in FIG. 2.

Processing circuitry 243 may execute machine learning system 204 using virtualization modules, such as a virtual machine or container executing on underlying hardware. One or more of such modules may execute as one or more services of an operating system or computing platform. Aspects of machine learning system 204 may execute as one or more executable programs at an application layer of a computing platform.

One or more input devices 244 of computing system 200 may generate, receive, or process input. Such input may include input from a keyboard, pointing device, voice responsive system, video camera, biometric detection/response system, button, sensor, mobile device, control pad, microphone, presence-sensitive screen, network, or any other type of device for detecting input from a human or machine.

One or more output devices 246 may generate, transmit, or process output. Examples of output are tactile, audio, visual, and/or video output. Output devices 246 may include a display, sound card, video graphics adapter card, speaker, presence-sensitive screen, one or more USB interfaces, video and/or audio output interfaces, or any other type of device capable of generating tactile, audio, video, or other output. Output devices 246 may include a display device, which may function as an output device using technologies including liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating tactile, audio, and/or visual output. In some examples, computing system 200 may include a presence-sensitive display that may serve as a user interface device that operates both as one or more input devices 244 and one or more output devices 246.

One or more communication units 245 of computing system 200 may communicate with devices external to computing system 200 (or among separate computing devices of computing system 200) by transmitting and/or receiving data, and may operate, in some respects, as both an input device and an output device. In some examples, communication units 245 may communicate with other devices over a network. In other examples, communication units 245 may send and/or receive radio signals on a radio network such as a cellular radio network. Examples of communication units 245 may include a network interface card (e.g., such as an Ethernet card), an optical transceiver, a radio frequency transceiver, a GPS receiver, or any other type of device that can send and/or receive information. Other examples of communication units 245 may include Bluetooth®, GPS, 3G, 4G, and Wi-Fi® radios found in mobile devices as well as Universal Serial Bus (USB) controllers and the like.

In the example of FIG. 2, neural networks 206 may receive input data from an input data set 210 and may generate output data 212. Input data 210 and output data 212 may contain various types of information. For example, input data 210 may include multimodal data. The term "multimodal data" or "multimodal information" is used herein to refer to information that may be composed of a plurality of media or data types such as, but not limited to, labeled text data, unlabeled text data, source text data, numerical data, speech data, and so on. Output data 212 may include classification data, translated text data, span labeling data, categorization data, transcription data, and so on.

Each set of layers 208 may include a respective set of artificial neurons. Layers 208A for example, may include an input layer, a feature layer, an output layer, and one or more hidden layers. Layers 208 may include fully connected layers, convolutional layers, pooling layers, and/or other types of layers. In a fully connected layer, the output of each neuron of a previous layer forms an input of each neuron of the fully connected layer. In a convolutional layer, each neuron of the convolutional layer processes input from neurons associated with the neuron's receptive field. Pooling layers combine the outputs of neuron clusters at one layer into a single neuron in the next layer.

Each input of each artificial neuron in each layer of the sets of layers 208 is associated with a corresponding weight in weights 216. Various activation functions are known in the art, such as Rectified Linear Unit (ReLU), Tan H, Sigmoid, and so on.

Machine learning system 204 may process training data 213 to train one or more of neural networks 206, in accordance with techniques described herein, if neural networks 216 do not comprise pre-trained model that were trained using training system 130. For example, machine learning system 204 may apply an end-to-end training method that includes processing training data 213. Machine learning system 204 may classify input 210 into different categories as described below.

In an aspect, machine learning system 204 may also include domain categorization model 250 to enable classification of text into different categories. The domain categorization model 250 may be a type of machine learning model that is used to classify text into different categories based on the domain of the text. For example, the domain categorization model 250 could be used to classify news articles into different categories, such as sports, politics, or business. In an aspect, the domain categorization model 250 may be trained on a dataset of text that has been labeled with the correct domain. The domain categorization model 250 may then learn the patterns in the data and may use those patterns to classify new text. Domain categorization model 250 may be used to filter out content that is not relevant to a particular domain. For example, the domain categorization model 250 could be used to filter out political news articles from a sports website.

Figure 3:
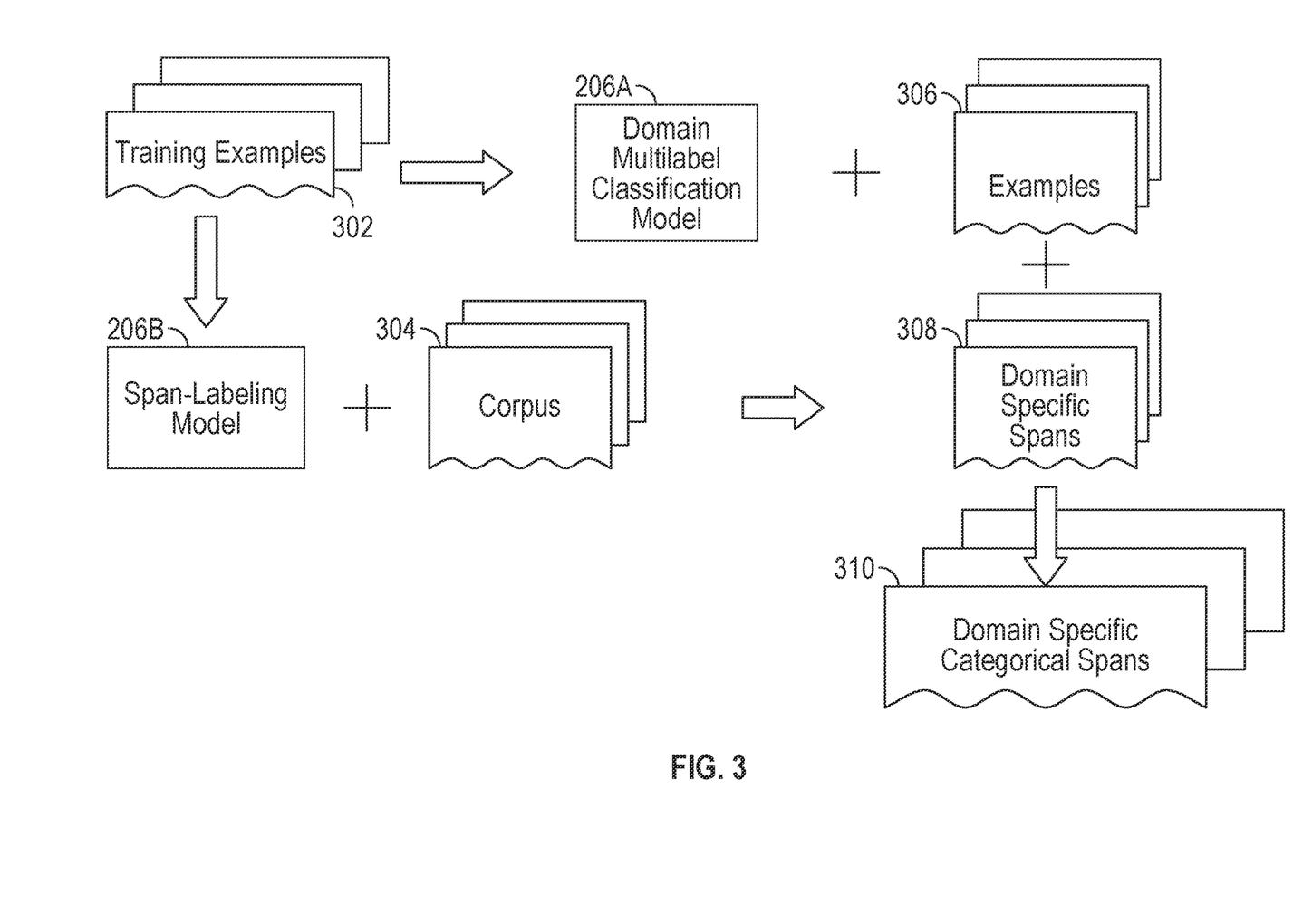
FIG. 3 is a diagram illustrating bootstrapping of a model adaptation system, according to techniques of this disclosure.

FIG. 3 is a diagram illustrating bootstrapping of model adaptation system 200, according to techniques of this disclosure. Bootstrapping is a statistical technique that may be used to estimate the uncertainty of a statistic. Bootstrapping technique may also be used in machine learning to estimate the uncertainty of a model's predictions. In machine learning, bootstrapping is often used to create a confidence interval for a model's prediction. In an aspect, to perform bootstrapping the model adaptation system 200 may repeatedly resample the data with replacement and then retrain the machine learning model 204 on each resample. Bootstrapping is a powerful technique that can be used to estimate the uncertainty of a model's predictions.

In an aspect, training examples 302 may include labeled input data. The labels for the training examples 302 may include aspect term labels. For example, each word in the sentence may be labeled as either "part of an aspect term" or "null" indicating that the word is not part of an aspect term for the particular domain of interest. Each aspect term may also be labeled with a respective aspect category label corresponding to one of a predefined set of at least two aspect categories. As one example, there may be at least four or at least ten pre-defined aspect categories related to the domain of interest, and in some embodiments, up to 50 pre-defined aspect categories. Aspect categories may be hierarchical such that one or more aspect categories (topics) has at least one or at least two sub-categories (sub-topics). Words in the sentence may also be labeled with sentiment phrase labels according to whether they are "part of a sentiment phrase" or not. The identified sentiment phrases may also be labeled with a polarity measure, for example, selected from among three polarity labels: positive, negative and neutral, or with values on a numerical scale ranging from highly positive to highly negative. The aspect and term labels may be in the form of XML tags, or the like.

In an aspect, training examples 302 may be taken from a publicly available dataset, such as the SemEval dataset. In this dataset, various terms may be annotated. In an aspect, SemEval tasks may encompass a broad range of semantic topics from the lexical level to the discourse level, including, but not limited to, word sense identification, semantic parsing, coreference resolution, and sentiment analysis, among others. Word sense identification task may involve identifying the correct sense of a word in a given context. For example, the word "bank" can have multiple senses, such as a financial institution or a riverbank. One goal is to identify the correct sense of the word "bank" in a given sentence, such as "I went to the bank to deposit my money." Semantic parsing task may involve converting natural language sentences into logical forms that can be understood by computers. For example, the sentence "I want to book a flight to New York" may be parsed into the logical form "Book (flight, New York)." Conference resolution task may involve identifying which noun phrases in a text refer to the same entity. For example, in the sentence "The man who ate the sandwich went to the store," the noun phrases "the man" and "he" refer to the same entity. The goal of this task is to identify the correct coreference links in a text. Sentiment analysis task may involve identifying the sentiment of a text, such as whether it is positive, negative, or neutral. For example, the sentence "I love this movie!" has a positive sentiment, while the sentence "I hated this movie!" has a negative sentiment.

As shown in FIG. 3, training examples 302 may be used as an input into the span labeling model 206B. The span labeling model 206B is a type of machine learning model that may be used to identify and label unlabeled textual spans. A textual span is a contiguous sequence of tokens in a text. For example, the sentence "The cat sat on the mat" contains the spans "The cat", "sat on", and "the mat". The span labeling model 206B may be trained on a dataset of labeled textual spans in the training examples 302. The dataset may consist of pairs of text and labels. The text may be a sequence of tokens, and the labels may be the spans of text that are relevant to the task at hand. For example, the span labeling model 206B for sentiment analysis might be trained on a dataset of sentences and span-level labels, where the span-level labels indicate the sentiment of the phrases (positive, negative, or neutral), as described above. In addition to sentiment analysis, the span labeling model 206B may be used for a variety of other tasks, such as, but not limited to identifying the entities in a sentence, extracting keywords from a document, and summarizing a text. When the span labeling model 206B is given a new text, the span labeling model 206B may predict the spans of text that are relevant to the task at hand. In an aspect, the span labeling model 206B may first identify all possible unlabeled textual spans in the input. Then, the span labeling model 206B may score each unlabeled textual span based on its features. The features that may be used by the span labeling model 206B to score spans may vary depending on the task at hand. For example, the span labeling model 206B configured to perform a sentiment analysis might use features such as the sentiment of the words in the unlabeled textual span, the position of the unlabeled textual span in the sentence, and the length of the unlabeled textual span. In an aspect, the span labeling model 206B may then select the unlabeled textual spans with the highest scores. The selected spans may be the predicted spans of text for the input. It should be noted that the span labeling model 206B may be used to identify relevant unlabeled textual spans in a variety of tasks and consistency loss learning.

In an aspect, the selected spans may be added to the corpus 304 by the machine learning system 204. In natural language processing (NLP), the corpus 304 may be a collection of text or speech data that may be used to train and evaluate NLP models. In an aspect, the corpus 304 may be annotated corpora. Annotated corpora may have been tagged with linguistic information, such as part-of-speech tags, named entities, or semantic relations. The corpus 304 may be used to train NLP models to perform tasks such as part-of-speech tagging, named entity recognition, and semantic parsing. In an aspect, the corpus 304 may comprise a domain specific corpus. A domain-specific corpus is a collection of text that is all from the same domain, such as medicine, law, or technology. The domain-specific corpus is different from a general corpus, which contains text from a variety of domains. In an aspect, the domain-specific corpus 304 may help to ensure that the machine learning model 204 is trained on text that is relevant to the domain that it may be used in. As a result, the domain-specific corpus 304 may lead to improved performance of the machine learning model 204 on NLP tasks such as text classification, named entity recognition, and machine translation. There are a number of different sources for domain-specific corpora. Some corpora may be publicly available, while others may be proprietary. Some corpora may be small, while others may be very large. In an aspect, the size and scope of the corpus 304 may depend on the specific needs of the NLP task that it is being used for. Some examples of domain-specific corpora may include but are not limited to: ScienceBlog (a corpus of blog posts about science), Environment (a corpus of text about environmental issues), and CAJA (a corpus of academic journal articles in the field of computer science).

As shown in FIG. 3, training examples 302 may be used as an input into the domain multilabel classification model 206A. In an aspect, domain multilabel classification model 206A may be a machine learning model that is configured to handle multilabel classification problems in a particular domain. In other words, the domain multilabel classification model 206A may be trained on a dataset of examples that are all from the same domain, such as medicine, law, or technology. Such configuration may help to improve the performance of the domain multilabel classification model 206A on the specific domain that it is being used for. Domain multilabel classification models can be built using a variety of different machine learning techniques, such as, but not limited to, binary relevance, label powerset, hierarchical, ensemble. Binary relevance technique may train a separate classifier for each label. Label powerset approach may create a classifier for each possible combination of labels. The label powerset approach may be computationally expensive, but this approach may be more accurate than binary relevance. The hierarchical approach may create a hierarchy of classifiers. The top-level classifier may be responsible for predicting the general category of the input. The lower-level classifiers may be responsible for predicting more specific labels. Ensemble approach may combine multiple domain multilabel classification models 206A to improve performance. It should be noted that the choice of technique may depend on the specific domain and the size and complexity of the dataset. Overall, the domain multilabel classification models 206A may be a powerful component for solving multilabel classification problems in a particular domain.

In an aspect, the output of the domain multilabel classification model 206A may be combined with examples of semantic inconsistencies, such as examples 306 detected by a semantic detection application. In an aspect, the semantic detection application may be a semantic forensics component that is configured to detect and identify semantic inconsistencies in media assets, such as but not limited to, documents. The semantic detection application may be used to detect a variety of semantic inconsistencies, including, but not limited to: mismatched objects, incorrect timestamps, and inconsistent text. For example, if a document contains text that is inconsistent with the images or videos in the document, the semantic detection application may detect this as a semantic inconsistency. The semantic detection application may be used to detect fake news articles by identifying semantic inconsistencies in the text of the article. For example, if an article claims that it was written by a journalist who works for a reputable news organization, but the article contains factual errors or inconsistencies, the semantic detection application may detect this as a semantic inconsistency. In an aspect, examples 306 may include one or more domain specific examples.

In an aspect, the machine learning system 204 may be configured to generate a plurality of domain specific spans 308 based on, at least the corpus 304. In other words, the machine learning system 204 may identify one or more spans 308 that are likely to be domain specific. A domain-specific span is a contiguous sequence of tokens in a text that has a specific meaning in a particular domain. For example, in the domain of medicine, the span "heart attack" is a domain-specific span because it refers to a specific medical condition. In an aspect, the domain-specific spans 308 may be used for semantic parsing. Semantic parsing is the task of converting natural language text into a formal representation that may be understood by a machine. For example, in the sentence "The patient had a heart attack," the span "heart attack" may be parsed into a medical condition with a specific set of symptoms and treatments.

In an aspect, the machine learning system 204 may generate the plurality of domain-specific spans 308 using a variety of techniques, such as, but not limited to, rule-based methods, statistical methods and hybrid methods. Rule-based methods may use a set of pre-configured rules to identify domain-specific spans 308. The rule-based method is a relatively simple approach, but this approach may be brittle and difficult to maintain. Statistical methods may use machine learning techniques to identify domain-specific spans. Statistical approach is a more complex approach, but this approach may be more accurate and robust than rule-based methods. Hybrid methods may combine rule-based and statistical methods to identify domain-specific spans 308. Hybrid approach may be a more effective approach than either rule-based or statistical methods alone. It should be noted that the choice of technique implemented by the machine learning system 204 may depend on the specific domain and the size and complexity of the datasets (e.g., the corpus 304). Some examples of domain-specific spans 308 may include but are not limited to: touchdown, home run, and goal in a sports domain; software, hardware, and algorithm in a technology domain; and heart attack, tumor and stroke in a medicine domain.

In an aspect, the machine learning system 204 may be further configured to generate a plurality of domain specific categorical spans 310 based on, at least the plurality of domain-specific spans 308. A domain-specific categorical span may be a contiguous sequence of tokens in a text that has a specific meaning in a particular domain and consists of two or more entities that belong to the same category in that domain. For example, in the domain of medicine, the span "heart attack" may be a domain-specific categorical span 308 because it refers to a specific medical condition and may consist of two entities, "heart" and "attack," that both belong to the category of medical conditions. In an aspect, the domain-specific categorical spans 310 may also be used for semantic parsing. In an aspect, the machine learning system 204 may generate the plurality of domain-specific categorical spans 310 using the same variety of techniques, such as, but not limited to, rule-based methods, statistical methods and hybrid methods discussed above. Advantageously, by identifying and understanding domain-specific categorical spans 310, NLP models may better understand the meaning of text in a particular domain.

Dataset drifts may have a significant impact on the performance of machine learning models. If a model is trained on a dataset that is not representative of the current data distribution, the model may not be able to make accurate predictions. In an aspect, the machine learning system 204 may be configured to dynamically adapt to dataset drifts and/or adapt to datasets from a different domain. In an aspect, the machine learning system 204 may continuously determine consistency loss on unlabeled new data. A high consistency loss may indicate that the model is not well-adapted to the new data. Higher consistency loss may be caused by concept drift, which is a change in the underlying distribution of the data over time.

Figure 4:
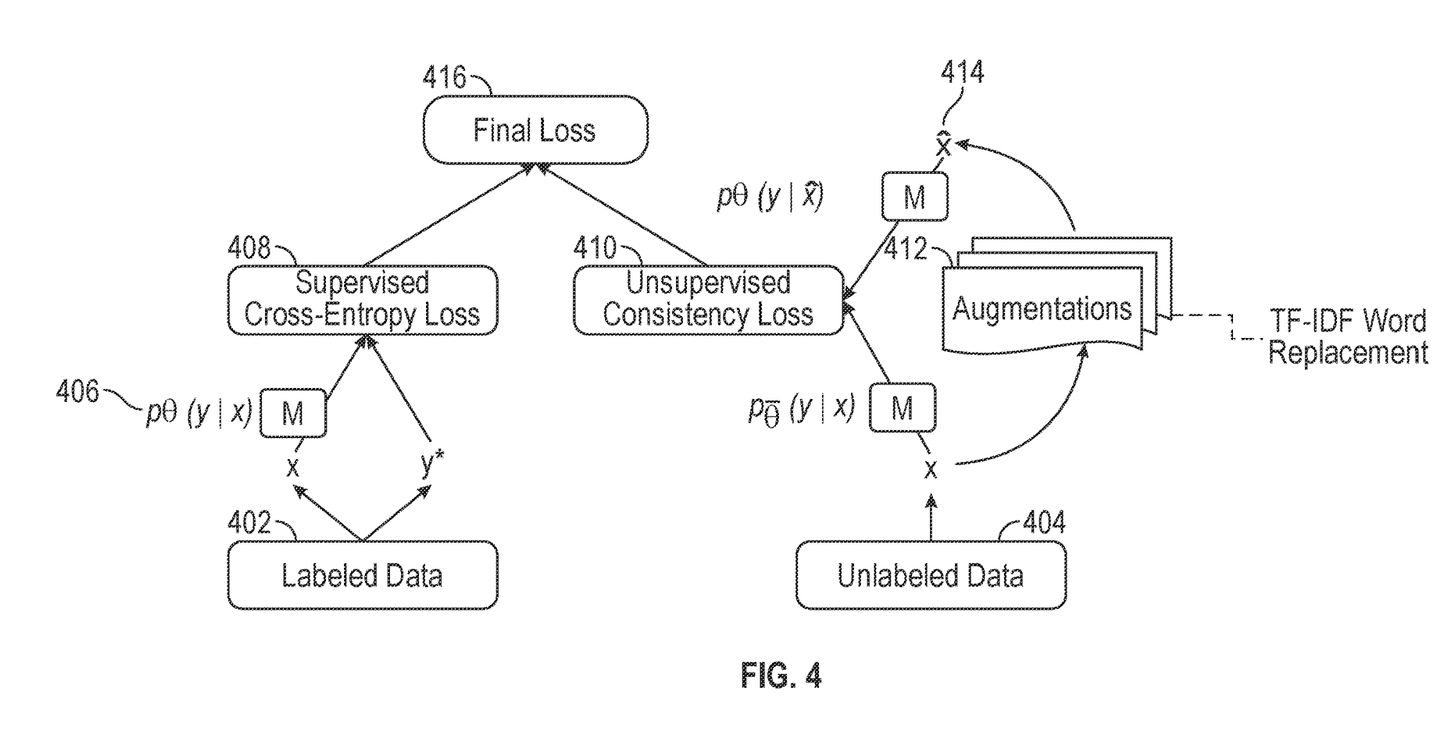
FIG. 4 is a flow chart illustrating an example process of determining consistency loss in a model adaptation system, according to techniques of this disclosure.

FIG. 4 is a flow chart illustrating an example process of determining consistency loss in model adaptation system 140 by consistency loss analyzer 170, according to techniques of this disclosure. In an aspect, the machine learning system 204 may be configured to perform unsupervised domain adaptation (UDA). UDA is a machine learning technique that enables training a model on a labeled dataset from one domain (the source domain) and applying it to a different domain (the target domain) with no labeled data. UDA technique may be useful in situations where it is difficult or expensive to obtain labeled data for the target domain. UDA works by aligning the distributions of the source and target domains. FIG. 4 illustrates training objective for UDA.

In an aspect, the training objective for UDA, where M is the model that predicts a distribution of y given x (e.g., machine learning model 204) may be to minimize the loss function represented by the following equation (2):

$$L = L\_s + L\_t, \qquad (2)$$

In equation (2),

L_s is the supervised loss on the source domain data. This loss may be a cross-entropy loss.

L_t is the unsupervised loss on the target domain data. This loss may be a consistency loss, which measures the similarity between the predictions of M on the original and augmented target domain data.

The consistency loss may be configured to enforce the model to be invariant to changes in the input data. The consistency loss is important for UDA, because the target domain data may be different from the source domain data. By minimizing the consistency loss, consistency loss analyzer 170 may help the machine learning model 204 to learn features that are invariant to the domain shift, and hence improve its performance on the target domain. In an aspect, the choice of the consistency loss may depend on the specific application and the amount of data available.

As shown in FIG. 4, the machine learning system 204 may make predictions using both labeled data 402 and unlabeled data 404. The main difference between labeled data 402 and unlabeled data 404 may be that labeled data 402 has been assigned a label, while unlabeled data 404 has not. As noted above, a label is a piece of information that describes the data, such as its class, category, or value. In an aspect, labeled data 402 and unlabeled data 404 may be from different domains.

In the context of UDA, the notation $p_\theta(y|x)$ 406 represents the distribution of the target domain labels given the source domain features. This distribution may be estimated from the labeled source domain data using a variety of techniques, such as, but not limited to, maximum likelihood estimation or Bayesian estimation. Once the distribution has been estimated by the machine learning system 204, this distribution may be used by the consistency loss analyzer 170 to improve the performance of the machine learning system 204 on the target domain.

In an aspect, the consistency loss analyzer 170 may employ supervised cross entropy loss function 408 for the labeled data 402. The supervised cross entropy loss 408 may be a loss function that may be used in supervised learning to measure the difference between the predicted probabilities of a model and the actual labels. In other words, the supervised cross entropy loss 408 may be a measure of how well the model is able to predict the correct label for a given input. Supervised cross entropy loss may be represented by the following formula (3):

$$H(y,p) = -\Sigma_{i=0}^{n} y_i \log p_i \qquad (3)$$

where:

y is the ground truth label (a vector of 0s and 1s, where 1 indicates the correct label and 0 indicates an incorrect label);

p is the predicted probability of the model (a vector of probabilities, where each element represents the probability that the input belongs to the corresponding class);

i is the index of the class;

H is the cross-entropy loss.

The cross-entropy loss 408 may be calculated by taking the sum of the logarithms of the predicted probabilities for the correct labels. The logarithms may be used to penalize the model for predicting low probabilities for the correct labels. The higher the cross-entropy loss 408, the worse the model is performing. Supervised cross entropy loss 408 may be a good choice for classification tasks because the supervised cross entropy loss 408 is easy to understand and implement, and it is relatively efficient to compute. In an aspect, the machine learning system's 204 predictions may be compared to the ground truth labels using the supervised cross entropy loss function 408. The machine learning system 204 may then be updated by the consistency loss analyzer 170 to minimize the loss function. This process may be repeated until the model converges (until the machine learning system 204 is no longer able to significantly reduce the cross-entropy loss function 408). Once the model has converged, the machine learning system 204 may be used to predict the class of new data. The machine learning system's 204 predictions may be evaluated using a variety of metrics, such as, but not limited to accuracy, precision, and recall.

In an aspect, the consistency loss analyzer 170 may also employ unsupervised consistency loss function 410 for the unlabeled data 404. The unsupervised consistency loss 410 is a loss function that may be used in UDA to encourage the machine learning system 204 to make consistent predictions on both the source and target domains. Consistent predictions may be achieved by training the machine learning system 204 to predict the same label for an input data sample after the input data sample has been augmented in different ways. The unsupervised consistency loss 410 may be defined as the sum of the distances between the predicted labels for an input data sample and its augmented versions. The distance metric may be any distance metric that is appropriate for the data, such as, but not limited to, the Euclidean distance, the cosine distance, or cross-entropy loss. In an aspect, the consistency loss analyzer 170 may first augment the unlabeled data 404 by applying a variety of augmentation transformations 412, as described below. The machine learning system 204 may then be trained to predict the label for each augmented data 414. The unsupervised consistency loss function 410 may be calculated by taking the sum of the distances between the predicted labels for the original unlabeled data 404 and its augmented versions 414. The unsupervised consistency loss 410 may help to ensure that the machine learning system 204 is learning features that are invariant to the domain shift between the source and target domains. This is important for UDA, because the target domain data may be different from the source domain data. By minimizing the unsupervised consistency loss 410, the consistency loss analyzer 170 may help the machine learning system 204 to learn features that are invariant to the domain shift, and hence improve its performance on the target domain.

In an aspect, the augmentation transformations 412 may include, but are not limited to the word level paraphrasing with methods such as Term Frequency—Inverse Document Frequency (TF-IDF) word replacement or the use of paraphrasing models.

As an example, when the machine learning system 204 input is natural language text, the augmentation transformation 412 technique may be a TF-IDF based word replacement technique. A TF-IDF based word replacement technique is a technique that replaces informative words with low TF-IDF scores while preserving those words with high TF-IDF values. For example, the machine learning system 204 may assign a probability based on the TF-DF value of the word to each word in the input, where words with higher TF-IDF values have higher probabilities. The machine learning system 204 may then sample a set number of words according to the assigned probabilities and replace each sampled word with, for example, a word sampled from the possible vocabulary of input words.

As shown in FIG. 4, the final loss 416 in UDA may be a combination of the supervised cross-entropy loss 408 and the unsupervised consistency loss 410. The supervised cross-entropy loss 408 may be used to train the machine learning system 204 on the labeled data 402 in the source domain, while the unsupervised consistency loss 410 may be used to encourage the machine learning system 204 to make consistent predictions on both the source and target domains. Final loss 416 may be represented by the following formula (4):

$$L = L_s + L_t \qquad (4)$$

where:
  $L_s$ is the supervised cross-entropy loss 408 on the source domain data and
  $L_t$ is the unsupervised consistency loss 410 on the target domain data.

The final loss 416 may be used by the consistency loss analyzer 170 to train the machine learning system 204 by minimizing the loss function. In an aspect, the loss function may be minimized using an optimizer, such as stochastic gradient descent. By minimizing the final loss 416, the consistency loss analyzer 170 may help the machine learning system 204 to make accurate predictions on both the source and target domains.

The choice of the weights 216 for the supervised cross-entropy loss 408 and the unsupervised consistency loss 410 may be a hyperparameter that may be tuned to improve the performance of the machine learning system 204. In general, it may be important to give more weight to the supervised cross-entropy loss 408 when the amount of labeled data 402 in the source domain is large because the supervised cross-entropy loss 408 may be more reliable when there is more labeled data 402. However, it may be important to give more weight to the unsupervised consistency loss 410 when the amount of labeled data 402 in the source domain is small because the unsupervised consistency loss 410 may help to improve the performance of the machine learning system 204 on the target domain even when there is limited labeled data 402.

Figure 5:
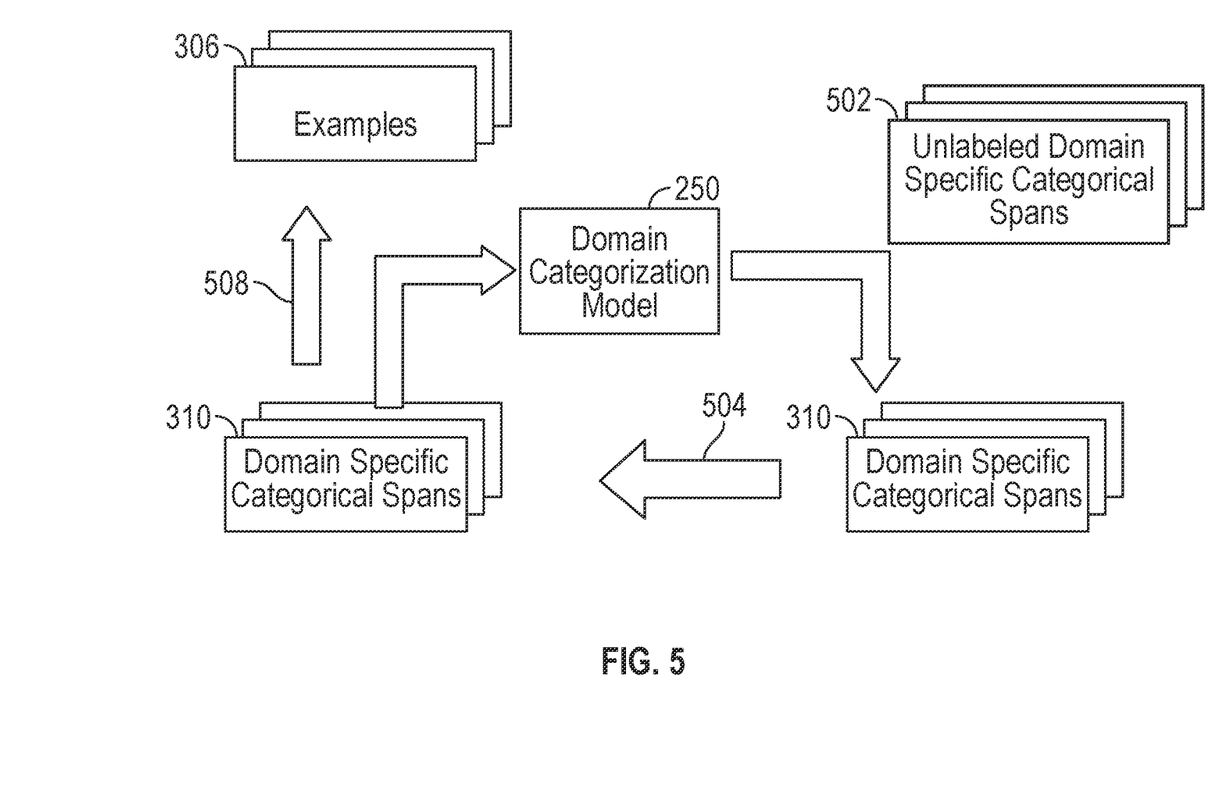
FIG. 5 is a schematic diagram of a process of active learning of the exemplary model adaptation system, according to techniques of this disclosure.

FIG. 5 is a schematic diagram of a process of active learning of the exemplary model adaptation system, according to techniques of this disclosure. Active learning is a machine learning paradigm where the learner actively queries the user for labels for unlabeled data points 404. Active learning is in contrast to passive learning, where the learner is passively given labeled data 402 points. Weak labeling is a type of active learning where the user may only be asked to provide a weak label for unlabeled data 404 point. A weak label may be a label that is less informative than a strong label. For example, a weak label for a term cat could be "furry animal". A strong label for the same term would be "cat". Weak labeling may be useful in situations where it may be difficult or expensive to obtain strong labels. For example, it may be difficult to obtain strong labels for medical terms because such labeling may require the expertise of a doctor. Weak labeling may be used to obtain weak labels for medical terms, for example, which may then be used to train the machine learning system 204 to classify medical terms. There are a number of different active learning algorithms that may be used with weak labeling.

One common algorithm is uncertainty sampling. Uncertainty sampling may select the unlabeled data points 404 that are the most uncertain for the learner. Such data points may be selected by evaluating the confidence of the learner's predictions for the unlabeled data points 404. The data points with the lowest confidence may be selected for labeling. Another common algorithm for weak labeling is query by committee. Query by committee may select the unlabeled data points 404 that are the most inconsistent with the predictions of a committee of learners. Such data points may be selected by comparing the predictions of the learners for the unlabeled data points 404. The data points with the most inconsistent predictions may be selected for labeling.

As shown in FIG. 5, active learning of machine learning system 204 may also involve the domain categorization model 250 configured to classify unlabeled text into different categories. The domain categorization model 250 may be a type of machine learning model that is used to classify text into different categories based on the domain of the text for both source and target domains. For example, the domain categorization model 250 could be used to classify news articles into different categories, such as sports, politics, or business, if the news articles are the target domain. In an aspect, the domain categorization model 250 may be trained on a dataset of text that has been labeled with the source domain. The domain categorization model 250 may then learn the patterns in the data and may use those patterns to classify new text in the target domain.

In an aspect, the domain categorization model 250 may be trained using a plurality of domain specific labeled categorical spans 310. In other words, the domain categorization model 250 may be trained on data that has been labeled with the correct domain and category. For example, if the domain categorization model 250 is being trained to classify text from the news domain, the training data (plurality of labeled domain specific categorical spans 310) would be labeled with the correct domain and category for each text. The plurality of labeled domain specific categorical spans 310 may allow the domain categorization model 250 to learn the relationships between the domain, category, and the text. Such knowledge may help the domain categorization model 250 to accurately classify new data that is from the same or different domain.

In an aspect, by learning the relationships between the domain, category and the text, the domain categorization model 250 may categorize a plurality of unlabeled domain specific categorical spans 502. The domain categorization model 250 may categorize the plurality of unlabeled domain specific categorical spans 502 by first identifying the domain of the text. Once the domain has been identified, the domain characterization model 250 may then use the relationships between the domain, category, and the text to identify the most likely category for each unlabeled domain specific categorical span 502. For example, if the domain characterization model 250 is presented with unlabeled domain specific categorical spans 502 about a recent political event, the domain characterization model 250 may first identify the domain of the text as "politics". The domain characterization model 250 may then use the relationships between the domain, category, and the plurality of spans to identify the most likely category for the unlabeled span, which would be "government". The ability to learn the relationships between the domain, category, and the text (spans) is what allows the domain categorization model 250 to categorize a plurality of unlabeled domain specific categorical spans 502. This is a powerful ability that may be used to improve the machine learning system 204 by allowing the machine learning system 204 to adapt to a new domain.

In active learning, the domain categorization model 250 may be iteratively trained on the set of labeled data (e.g., labeled domain specific categorical spans 310). The domain categorization model 250 may then predict the labels for a larger set of unlabeled data (unlabeled domain specific categorical spans 502). The labeled data that is most informative for the domain categorization model 250 may then be selected for labeling. In an aspect, the machine learning system 204 may review 504 a plurality of system labeled domain specific categorical spans 310 during active learning by using a technique called uncertainty sampling. Uncertainty sampling may select the unlabeled domain specific categorical spans 502 that are the most uncertain for the domain categorization model 250, for example, by evaluating the confidence of the domain categorization model's 250 predictions for the unlabeled domain specific categorical spans 502. The domain specific categorical spans 502 with the lowest confidence may be selected for labeling. Reviewing 504 the plurality of system labeled domain specific categorical spans 310 during active learning is an important step in the process of improving the machine learning system's 204 accuracy. By selecting the most informative data for labeling, the domain categorization model 250 may be trained more effectively and efficiently.

Furthermore, during active learning, the plurality of domain specific categorical spans 310 may be tested 508 against examples 306. In other words, the machine learning system 204 may compare the labeled domain specific categorical spans 310 to a set of examples that are known to be correct. If the labeled domain specific categorical spans 310 match the examples 306, then they may be considered to be correct. If the labeled domain specific categorical spans 310 do not match the examples 306, then they may be considered to be incorrect. The process illustrated in FIG. 5 may be repeated until the domain categorization model 250 has converged or until a desired level of accuracy is achieved.

Figure 6:
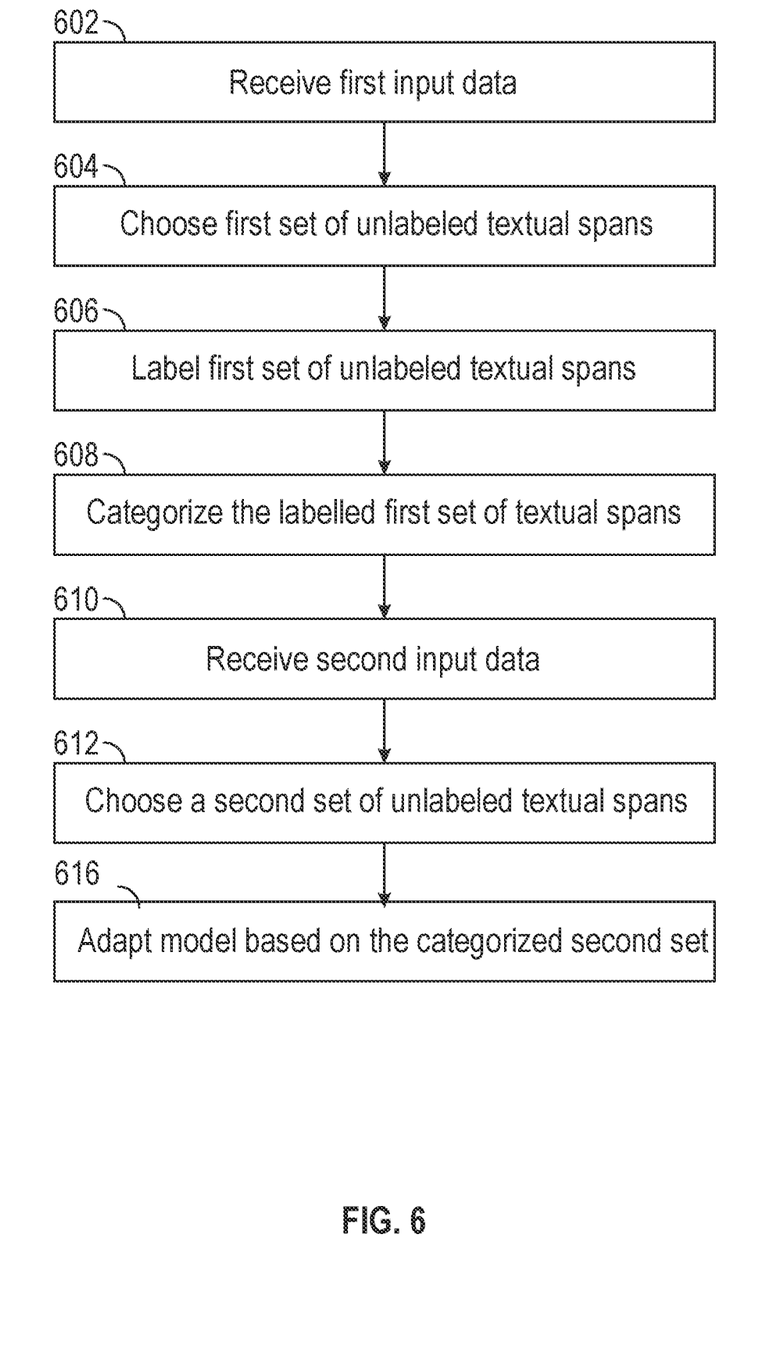
FIG. 6 is a flowchart illustrating an example mode of operation for a machine learning system, according to techniques described in this disclosure.

FIG. 6 is a flowchart illustrating an example mode of operation for a machine learning system, according to techniques described in this disclosure. Although described with respect to computing system 200 of FIG. 2 having processing circuitry 243 that executes machine learning system 204, mode of operation 600 may be performed by a computation system with respect to other examples of machine learning systems described herein.

In mode of operation 600, processing circuitry 243 executes machine learning system 204. Machine learning system 204 may receive first input data, such as, for example, training example 302 (602). Machine learning system 204 may choose a first set of unlabeled textual spans in the first input data (604). The chosen first set of unlabeled textual spans may be associated with a first domain. Machine learning system 204 may next label the chosen first set of unlabeled textual span to generate a labeled first set of textual spans s (606). In an aspect, machine learning system 204 may categorize the labeled first set of textual spans to generate a categorized labeled first set of textual spans (608). In addition, machine learning system 204 may receive second input data (610). The second input data may be associated with a different domain, for example. Machine learning system 204 may next choose a second set of unlabeled textual spans. The chosen second set of unlabeled textual spans may be associated with a second domain (612). Next, machine learning system 204 may adapt to the second domain based on the categorized second set of unlabeled textual spans that is generated based on the categorized labeled first set of textual spans (616).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in computer-readable media, such as a computer-readable storage medium, containing instructions. Instructions embedded or encoded in one or more computer-readable storage mediums may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A method of adapting a machine learning model comprising:
   receiving first input data;
   choosing a first set of unlabeled textual spans in the first input data, wherein the chosen first set of unlabeled textual spans is associated with a first domain;
   labeling the chosen first set of unlabeled textual spans to generate a labeled first set of textual spans,
   categorizing the labeled first set of textual spans to generate a categorized labeled first set of textual spans for the machine learning model;
   receiving second input data;
   choosing a second set of unlabeled textual spans in the second input data, wherein the second set of unlabeled textual spans is associated with a second domain;
   categorizing the second set of unlabeled textual spans, based on the categorized labeled first set of textual spans, to generate a categorized second set of unlabeled textual spans using a relationship between the first domain, text of the labeled first set of textual spans, and a corresponding category; and
   adapting the machine learning model to the second domain based on the categorized second set of unlabeled textual spans using model adaptation, at least in part, based on a performed consistency loss analysis.

2. The method of claim 1,
   wherein the first domain is associated with a first time period and the second domain is associated with a second time period and
   wherein the first domain includes old data and the second domain includes contemporary data.

3. The method of claim 1, further comprising calculating a cross-entropy loss value for labeled data comprising at least the categorized labeled first set of textual spans.

4. The method of claim 3, further comprising calculating a consistency loss value for unlabeled data comprising at least the second set of unlabeled textual spans.

5. The method of claim 4, wherein performing the consistency loss analysis further comprises adding the cross-entropy loss value and the consistency loss value.

6. The method of claim 4, wherein performing the consistency loss analysis further comprises applying one or more augmentation transformations to the unlabeled data.

7. A computing system comprising:
   an input device configured to receive first input data and second input data;
   processing circuitry and hardware memory for executing a machine learning system, wherein the machine learning system is configured to:
      choose a first set of unlabeled textual spans in the first input data, wherein the chosen first set of unlabeled textual spans is associated with a first domain;
      label the chosen first set of unlabeled textual spans to generate a labeled first set of textual spans;
      categorize the labeled first set of textual spans to generate a categorized labeled first set of textual spans for the machine learning model;
      choose a second set of unlabeled textual spans in the second input data, wherein the second set of unlabeled textual spans is associated with a second domain;
      categorize the second set of unlabeled textual spans, based on the categorized labeled first set of textual spans, to generate a categorized second set of unlabeled textual spans using a relationship between the first domain, text of the labeled first set of textual spans, and a corresponding category; and
      adapt the machine learning model to the second domain based on the categorized second set of unlabeled textual spans using model adaptation, at least in part, based on a performed consistency loss analysis.

8. The computing system of claim 7,
   wherein the first domain is associated with a first time period and the second domain is associated with a second time period and
   wherein the first domain includes old data and the second domain includes contemporary data.

9. The computing system of claim 7, wherein the machine learning system is further configured to:
   calculate a cross-entropy loss value for labeled data comprising at least the categorized labeled first set of textual spans.

10. The computing system of claim 9, wherein the machine learning system is further configured to:
    calculate a consistency loss value for unlabeled data comprising at least the second set of unlabeled textual spans.

11. The computing system of claim 10, wherein the machine learning system configured to perform the consistency loss analysis is further configured to:
   add the cross-entropy loss value and the consistency loss value.

12. The computing system of claim 10, wherein the machine learning system configured to perform the consistency loss analysis is further configured to:
   apply one or more augmentation transformations to the unlabeled data.

13. Non-transitory computer-readable media comprising machine readable instructions for configuring processing circuitry to:
   receive first input data;
   choose a first set of unlabeled textual spans in the first input data, wherein the chosen first set of unlabeled textual spans is associated with a first domain;
   label the chosen first set of unlabeled textual spans to generate a labeled first set of textual spans;
   categorize the labeled first set of textual spans to generate a categorized labeled first set of textual spans for the machine learning model;
   receive second input data;
   choose a second set of unlabeled textual spans in the second input data, wherein the second set of unlabeled textual spans is associated with a second domain;
   categorize the second set of unlabeled textual spans, based on the categorized labeled first set of textual spans, to generate a categorized second set of unlabeled textual spans using a relationship between the first domain, text of the labeled first set of textual spans, and a corresponding category; and
   adapt the machine learning model to the second domain based on the categorized second set of unlabeled textual spans using model adaptation, at least in part, based on a performed consistency loss analysis.

14. The non-transitory computer-readable media of claim 13,
   wherein the first domain is associated with a first time period and the second domain is associated with a second time period and
   wherein the first domain includes old data and the second domain includes contemporary data.

15. The non-transitory computer-readable media of claim 13, wherein the instructions further comprise instructions to:
   calculate a cross-entropy loss value for labeled data comprising at least the categorized labeled first set of textual spans.

16. The non-transitory computer-readable media of claim 15, wherein the instructions further comprise instructions to:
   calculate a consistency loss value for unlabeled data comprising at least the second set of unlabeled textual spans.

17. The non-transitory computer-readable media of claim 16, wherein the instructions further comprise instructions to:
   add the cross-entropy loss value and the consistency loss value.

\* \* \* \* \*